United States Patent
Ounadjela et al.

(10) Patent No.: US 8,199,609 B2
(45) Date of Patent: Jun. 12, 2012

(54) MULTI-MODE DOWNHOLE ACOUSTIC SOURCE

(75) Inventors: Abderrhamane Ounadjela, Somerville, MA (US); Marthe Souquiere, Loc Maria Plouzane (FR); Henri-Pierre Valero, Belmont, MA (US); Sandip Bose, Brookline, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 589 days.

(21) Appl. No.: 12/367,866

(22) Filed: Feb. 9, 2009

(65) Prior Publication Data

US 2010/0202252 A1 Aug. 12, 2010

(51) Int. Cl.
*G01V 1/00* (2006.01)
(52) U.S. Cl. .......................................... 367/25; 367/157
(58) Field of Classification Search .................... 367/25, 367/155, 157, 911, 912; 181/102, 122; 310/334, 310/328, 367
See application file for complete search history.

(56) References Cited

U.S. PATENT DOCUMENTS

| | | | |
|---|---|---|---|
| 4,525,645 A | 6/1985 | Shirley et al. | |
| 4,845,688 A * | 7/1989 | Butler | 367/174 |
| 5,081,391 A * | 1/1992 | Owen | 310/334 |
| 5,477,101 A | 12/1995 | Ounadjela | |
| 5,731,550 A | 3/1998 | Lester et al. | |
| 6,614,360 B1 * | 9/2003 | Leggett et al. | 340/853.1 |
| 2005/0087391 A1 * | 4/2005 | Ounadjela | 181/121 |
| 2007/0034413 A1 | 2/2007 | Kupchinsky et al. | |

* cited by examiner

*Primary Examiner* — Jack W Keith
*Assistant Examiner* — Krystine Breier
(74) *Attorney, Agent, or Firm* — Jianguang Du; Brigitte Jeffery Echols; Jeff Griffin (57) ABSTRACT

A multimode acoustic source device for disposition in a borehole formed in a subterranean formation is aligned along an axial axis of the borehole and has a plurality of radiating plates circumferentially disposed about the axial axis. A drive mechanism is proposed to independently and reversibly move each radiating plate from a first position to a second position in a direction transverse to the axial axis. This enables the multimode source to generate each of several azimuthal modes for logging a subterranean formation.

18 Claims, 10 Drawing Sheets

MULTI-MODE DOWNHOLE ACOUSTIC SOURCE

CROSS REFERENCE TO RELATED APPLICATION(S)

N.A.

U.S. GOVERNMENT RIGHTS

N.A.

BACKGROUND OF THE INVENTION

1. Field of the Invention

The present disclosure relates to acoustic logging of formations surrounding a borehole. More particularly the present disclosure is drawn to a multi-mode acoustic source to be used with logging-while-drilling systems or wireline tools.

2. Description of the Related Art

The generation and recording of acoustic waves through a subterranean formation is a key measurement employed in wellbore logging. Sound waves are generally classified into two types: longitudinal and transverse. A longitudinal, or compression, wave is one in which the medium oscillates in the same direction as the wave propagates. A transverse, or shear, wave is one in which the medium oscillates perpendicular to the direction of wave propagation. Both types of waves and in particular their velocities are of interest in oilfield applications. Acoustic waves propagate underground at velocities that vary depending on different geological formations. For example, the compression wave travels at about 4000 meters per second (13,123 feet per second) through sandstone and about 5000 meters per second (16,404 feet per second) through limestone. A log of sound speed or velocity as a function of depth is key to geophysical inversion. Additionally the acoustic velocity depends on rock properties such as porosity, stress state, rock strength, etc. and so its measurement has important applications in geomechanics and petrophysics.

Being able to take measurements as a well is being drilled, which is called logging-while-drilling, is advantageous since it enables reduced drilling time thereby reducing rig costs. Logging-while-drilling also enables the driller to accurately correct the direction of the drill using collected and processed data sent uphole via telemetry.

Acoustic measurements in a borehole provide information related to the velocity of an acoustic wave propagating in the formation as well as other features such as alterations, stress estimation, etc. In order to make these measurements, there is a need to develop a hardware device, called a logging tool, to be deployed in any deep hole, such as an oil well or $CO_2$ well, that is capable of generating and recording acoustic waves propagating in the borehole. A sonic logging tool typically includes a transmitter source and an array of receivers separated by a known distance. Acoustic energy is radiated from the transmitter source into the borehole medium where it excites multiple waves propagating along the borehole to the receiver array where they are recorded as waveforms. Waves propagating in the borehole environment can be divided into two types; dispersive and non-dispersive. Acoustic dispersion refers to the phenomenon that waveform slowness (reciprocal of velocity) changes with frequency. Acoustic waves whose slowness does not change with frequency are said to be non-dispersive. Examples include P&S compressional and shear headwaves. Waveforms generated from borehole modes like LeakyP, Dipole flexural and Stoneley whose slownesses change with frequency are dispersive (Sinha and Zeroug, 1997). Analysis of the dispersion characteristic of these borehole modes is the basis for many new sonic answer products.

Acoustic modes are categorized by their azimuthal order as monopole (zeroth mode), dipole (first), quadrupole (second) and so on and are generated based on the pulsing mode of a source. A monopole source shrinks and expands, thus imitating heart beats: it pushes back and forth the fluid it is in contact with. This is the most basic mode and higher order modes can be synthesized from a collection of such monopole sources. A dipole mode is generated by a source oscillating on the horizontal axis: it acts much more like a spoon stirring fluid with a single degree of freedom. A quadrupole source expands on two opposite sides while shrinking at the same time on the two perpendicular sides: this makes it resemble a ball pinched between the thumb and forefingers, and would then switch its shape to that of an American or rugby football. As each of these modes provide different information about the formation, it is useful for a sonic tool to be able to generate waves pulsing according to each of several modes, which is then called a multi-mode source. It is current practice for each mode to be generated by a different hardware source.

One requirement of a multi-mode source is to generate sufficient energy to be delivered and coupled into desired modes with an adequate signal to noise ratio (SNR) at the receivers for useful measurements. The signal to noise ratio is particularly important in high noise environments such as exist in logging-while-drilling scenarios or when the formation being excited by the acoustic wave is very attenuative (slow formation, for example). Hence there is a need for a powerful and efficient multi-mode acoustic source that remedies the weaknesses of the sources currently used.

BRIEF SUMMARY

The details of one or more embodiments are set forth in the accompanying drawings and the description below. Other features, objects and advantages will be apparent from the description and drawings, and from the claims.

Described herein is a multi-mode acoustic source designed to be used in logging-while-drilling (LWD) or in wireline tools. The acoustic source device is aligned along an axial axis of the borehole in proximity to a drill bit for LWD applications or in proximity to a measurement device (sonde) for wireline logging operations and has a plurality of radiating plates circumferentially disposed about the axial axis. A drive mechanism is used to independently and reversibly move each radiating plate from a first position to a second position in a direction transverse to the axial axis. The acoustic source device is useful to generate waves for logging a subterranean formation.

To compensate for limited space along the radial direction of a cylindrical tool, motors are oriented along the major axis to take advantage of the available space in that direction. A cone convertor is used to convert the axial displacement of the motor into radial displacement of a radiating plate. This cone convertor provides efficient transfer of energy. By choosing an appropriate angle of the cone, the impedance of the motor can be matched to that of the surrounding medium thereby maximizing the output energy radiated.

In one embodiment, two axial motors design a broad-band source without resonance in the frequency band. The acoustic source is made of several independent segments along the azimuth, and each segment is actuated by two axial motors. Three azimuthal modes of radiation, monopole, dipole and quadrupole, requires four quadrants, higher modes require more segments. The excitation of the four quadrants in phase results in the radiation of the monopole mode, the dipole mode is generated by driving two opposing quadrants out of phase and the quadrupole mode is obtained by driving the two pairs of opposing quadrants out of phase, with the quadrants in each pair being excited in phase, i.e., when one pair of quadrants contracts, the other pair expands.

BRIEF DESCRIPTION OF THE DRAWINGS

Like reference numbers and designations in the various drawings indicated like elements.

DETAILED DESCRIPTION

Figure 1:
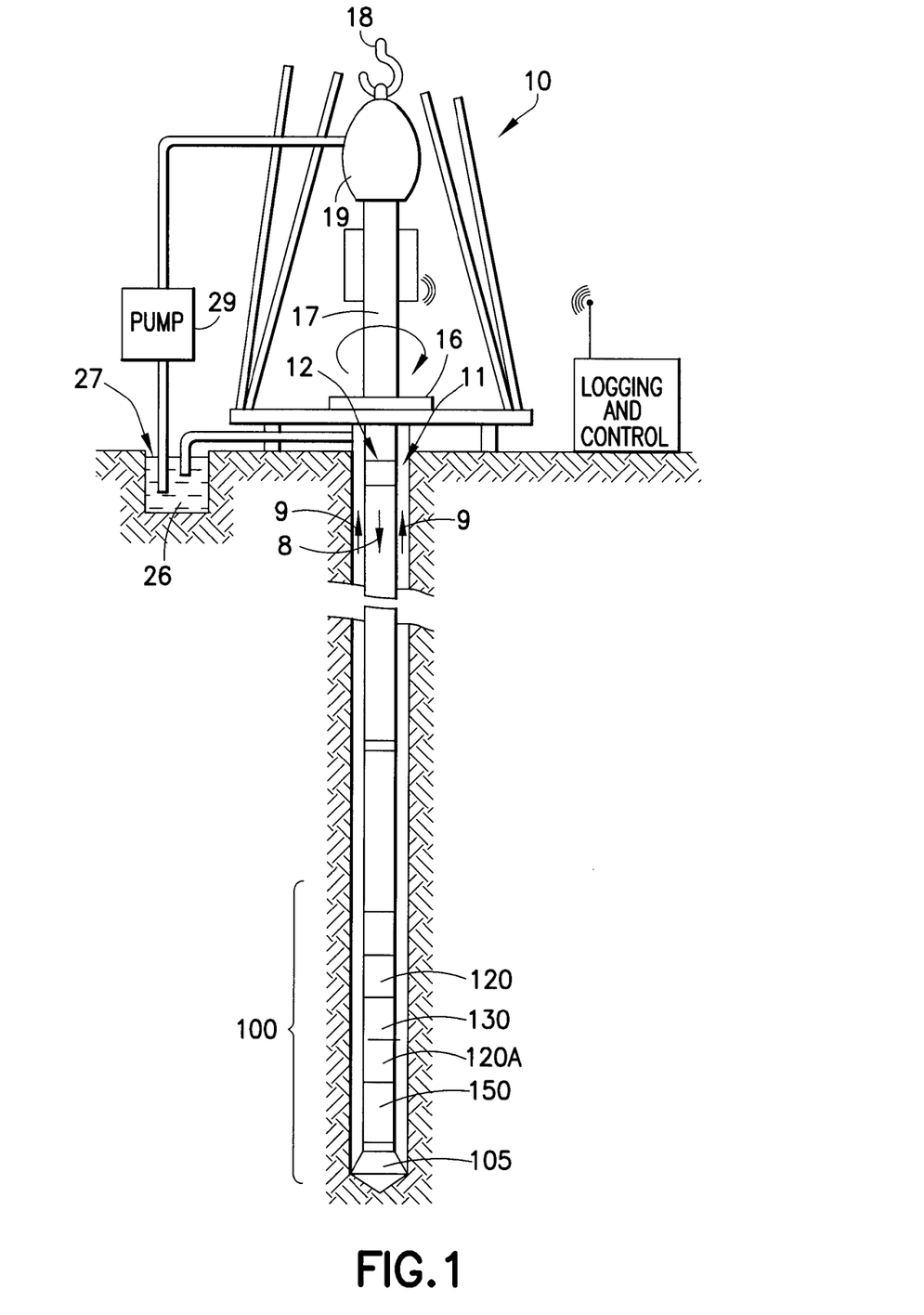
FIG. 1 illustrates a logging while drilling system in which the downhole acoustic sources disclosed herein may be employed.

FIG. 1 illustrates a wellsite system in which the downhole acoustic sources disclosed herein may be employed. The wellsite can be onshore or offshore. In this exemplary system, a borehole 11 is formed in a subsurface formation by rotary drilling in a manner that is well known. The acoustic sources may also be used with wireline logging, directional drilling, as well as other drilling techniques known in the oil and gas industries.

In the exemplary embodiment of FIG. 1, related to a logging-while-drilling operation, a drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from hook 18, attached to a traveling block (also not shown), through the kelly 17 and rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a sonic measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module may include one or more of the following types of measuring devices: a weight-on-bit measuring device, a torque measuring device, a vibration measuring device, a shock measuring device, a stick slip measuring device, a direction measuring device, and an inclination measuring device.

Figure 2:
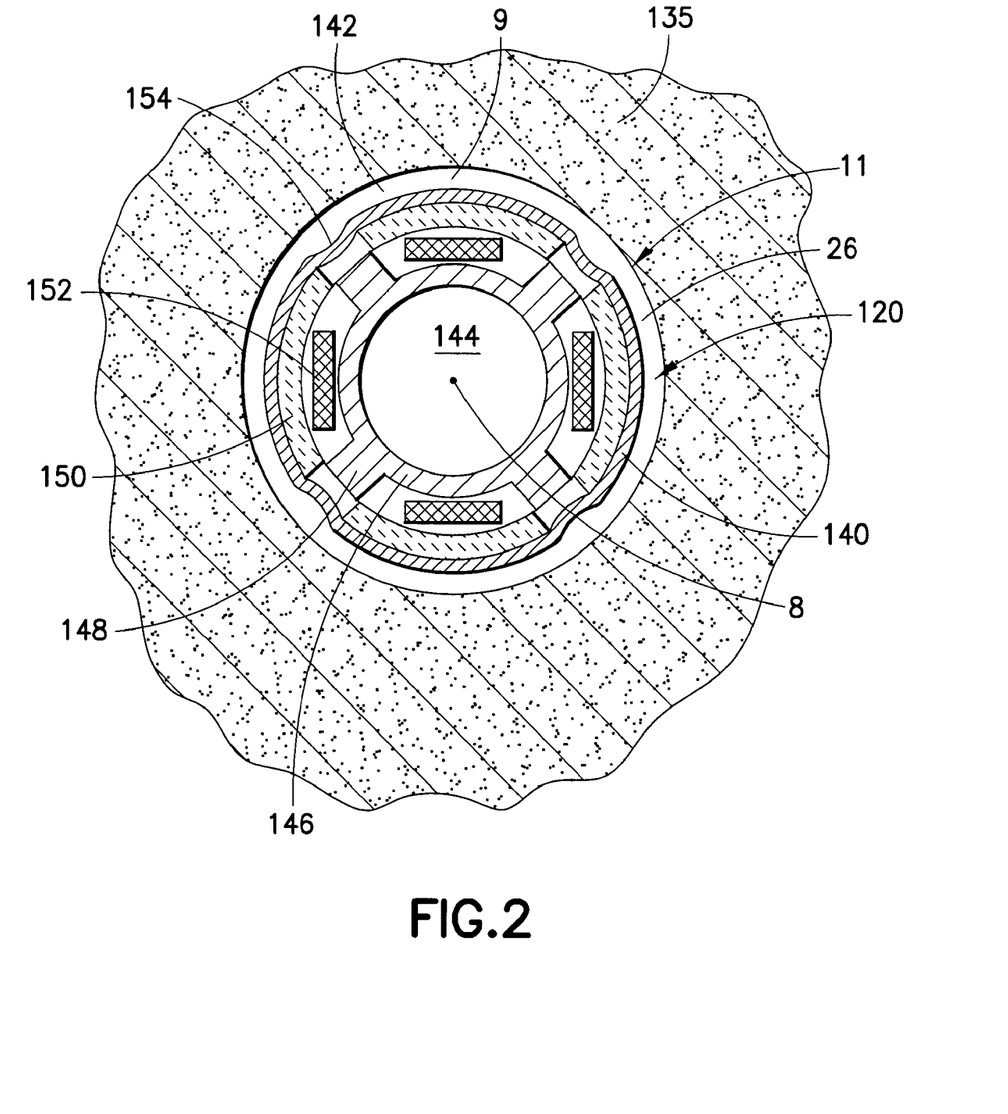
FIG. 2 illustrates a multimode downhole acoustic source viewed transverse to the axial direction of the borehole.

FIG. 2 illustrates a multimode downhole acoustic source as a logging-while-drilling module 120 as viewed in a direction transverse to the axial direction of bore hole 11, with the bore hole 11 extending through formation 135. The acoustic source 120 has an outer sleeve 140 that isolates the acoustic source from drilling mud flowing 9 back to the surface in an annular ring 142 disposed between the outer sleeve 140 and the walls of the borehole 11. Downward flowing 8 mud traverses an interior bore 144 that is surrounded by an inner tube 146. Inner tube 146 projections 148 divide the acoustic source into segments. While the embodiment disclosed in FIG. 2 divides the segments as four quadrants and is effective to provide three modes of radiation, monopole, dipole and quadrupole, as higher azimuthal modes of radiation are required, the acoustic tool may be divided into even more segments.

The acoustic source 120 is pressure compensated, meaning the body is filled with oil. The idea is to have the same pressure inside the acoustic source and outside and also all segments are hydraulically connected together. For the monopole mode, the hydraulic connection is not important but for the dipole and the quadrupole, while in one segment the fluid, for example, is compressed and the other expanded, the hydraulic connection ensures dynamic pressure compensation inside the cavity.

Each segment includes a radiating plate 150 that is circumferentially disposed about an axial axis of the acoustic source 120 and is independently driven by a drive mechanism, such as motor 152. The motor 152 is effective to drive a respective radiating plate 150 either towards the wall of borehole 11 or away from the wall thereby generating an energetic pulse that travels through the drilling fluid 26 and into the formation 135. This pulse, in the form of a compression wave or a shear wave, may be received by receivers built into the drill string and used to interpret data about drilling status. A flexible portion 154 of the outer sleeve 140 is formed between each segment thereby isolating each segment from the other segments to enable independent operation of each segment.

Figure 3:
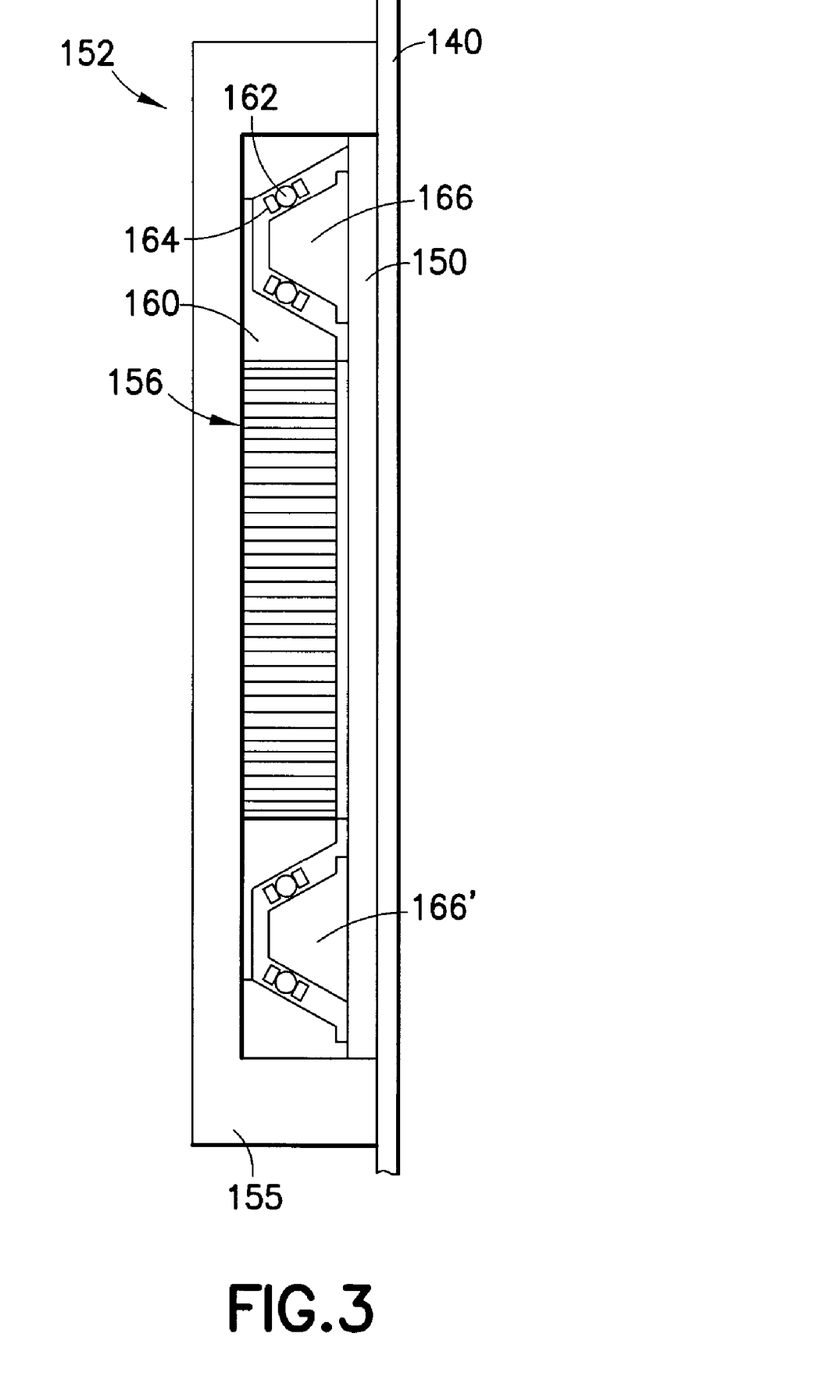
FIG. 3 illustrates a motor used to drive the downhole acoustic source of FIG. 2.

FIG. 3 illustrates a motor 152 as viewed in cross-section along the axial length of the borehole. The motor 152 is effective to drive radiating plate 150 in a direction transverse to the axial direction of the borehole. The motor 152 includes a motor housing 155 containing a plurality of stacked piezoelectric ceramic plates 156. A suitable piezoelectric material is lead-zirconate-titanate ceramic such as PZT4 or PZT8, both available from Morgan Electro Ceramics, Fairfield, N.J. PZT4 has a slightly larger dimension change when subjected to an electric field while PZT8 has a slightly smaller dimension change but lower dielectric loss when subjected to a similar electric field. A nominal thickness of the ceramic plates is from 3 millimeters (0.118 inch) to 6 mm (0.236 in.). Typically, the stack will contain from about 40 to 100 ceramic plates. The piezoelectric ceramic plates change dimensions when an effective electric field, nominally 500 V/mm, is impressed.

Since the plates are mounted in a direction along the axial length of the borehole, there is considerably more room to stack the plates than were they stacked transverse to the axial length of the borehole. At least one side of the stack of piezoelectric ceramic plates 156 contacts a mechanical linkage effective to convert axial movement of the piezoelectric ceramic plates into radially movement of the radiating plate. One type of mechanical linkage is a slidable cone converter base 160. Movement of the slidable cone converter base 160 rotates the rolling bars 162 that are held in place by roller journals 164. Rotation of the rolling bars 162 causes an outward cone portion 166 to move in a direction transverse to the borehole axis thereby creating an energetic pulse that passes through the drilling fluid and into the formation.

The multi-mode acoustic radiation of the source results from the motion of the source segmented along its azimuth. For example, the three modes of radiation, introduced previously are generated by a cylindrical tool divided into four independent quadrants. Higher azimuthal modes of radiation can be excited by dividing the source into more segments, the higher the mode, the greater the segmentation of the tool needs to be.

Figure 4:
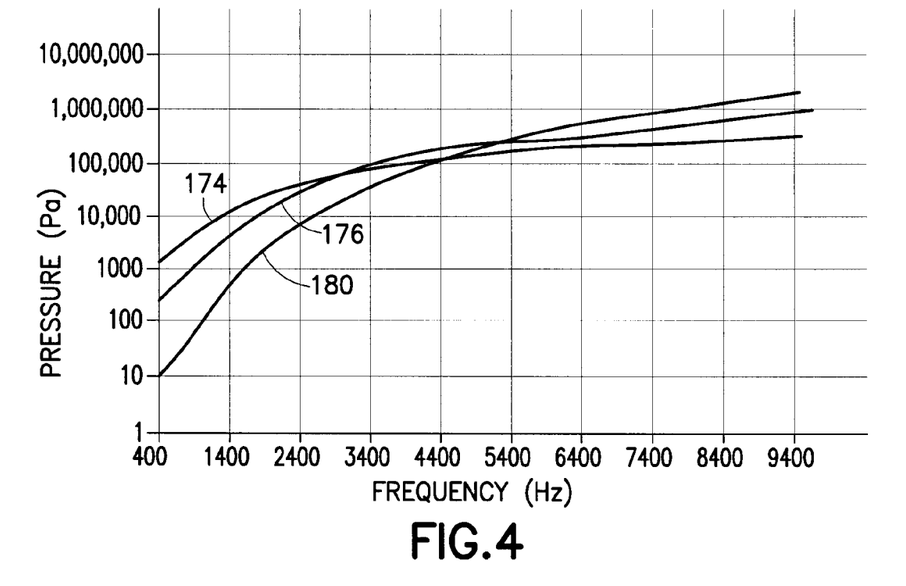
FIG. 4 illustrates the pressure generated by different modes of operation of the multimode downhole acoustic source as a function of frequency.

One preferred embodiment is to design a tool composed of four equal quadrants. The first mode of radiation, i.e. the monopole mode, is generated by driving the four quadrants in phase. In a free field, its acoustic pressure yields to a uniform radiation pattern along the azimuth. The dipole mode is obtained by driving one pair of quadrants out of phase. In this case, the source has a maximum pressure along the vibration of the source axis while at 90 degree the pressure field is minimal. These two pairs of quadrants allow generating two dipoles sources with a radiation patterns orthogonal to each other. The acoustic radiation of the tool while exciting a quadrupole mode is activated by driving the two pairs of quadrants out of phase. FIG. 4 illustrates the pressure (in Pa) generated by different modes of operation of the multimode downhole acoustic source as a function of frequency (in Hz).

Figure 4A:
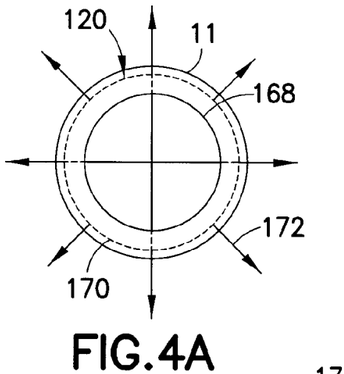

FIG. 4A illustrates the acoustic source 120 in monopole pressure mode. The four quadrants move from position 1 (solid line 168) to position 2 (broken line 170). The resulting pressure wave 172 moves outward from the borehole 11 into the formation. Reference line 174 illustrates the pressure one meter in free field generated by the monopole mode as a function of the frequency of the acoustic source 120.

Figure 4B:
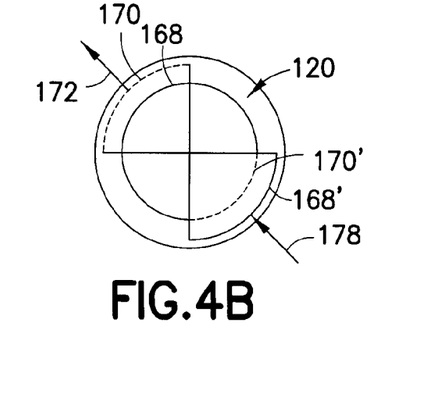

FIG. 4B illustrates the acoustic source 120 in dipole mode. One quadrant moves from position 1 (168) to position 2 (170) while an opposing quadrant is out of phase by 180° and, at the same time, moves from position 1 (168') to position 2 (170"). The remaining two quadrants typically remain stationary. A first pressure wave 172 moves outward from the borehole 11 into the formation from the first quadrant as a function of the frequency of the acoustic source. While a second pressure wave 178 is 180° out of phase with the first pressure wave. Reference line 176 illustrates the pressure one meter into the formation generated by the dipole mode as a function of the frequency of the acoustic source 120.

Figure 4C:
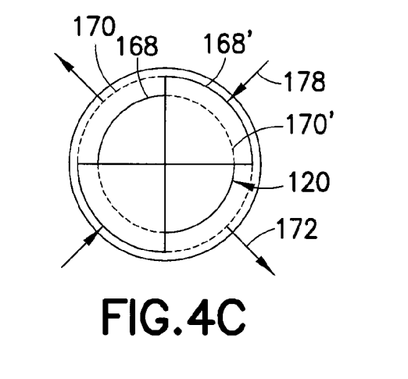

FIG. 4C illustrates the acoustic source 120 in quadrupole mode. Two opposing quadrants move from position 1 (168) to position 2 (170) while the remaining two quadrants move from position 2 (170') to position 1 (168'). A first pressure wave 172 moves outward from the borehole 11 into the formation from the two opposing quadrants as a function of the frequency of the acoustic source. While a second pressure wave 178 is 180° out of phase with the first pressure wave 172. Reference line 180 illustrates the pressure one meter into the formation generated by the dipole mode as a function of the frequency of the acoustic source 120.

An interesting point is the comparison of the response of the three acoustic modes. At low frequency, the most efficient mode is the monopole source 174 as the higher modes, m=1, m=2 radiate less pressure at low frequency. However FIG. 4 illustrates that the three curves intersect at higher frequencies depending on the factor ka, i.e., the product of the borehole radius and wave number.

The acoustic radiation of the source being the resulting motion of the four quadrants, the displacement is applied to the sides of each quadrant through a force applied on its walls. The force itself is generated by a motor, for example, a piezoelectric motor, a hydraulic unit or a linear electromagnetic device. A preferred motor is a piezoelectric motor having a stack of annular plates. The motor expands and contracts under high voltage and actuates the cone-converter. The number of ceramic plates governs the electromechanical energy delivered, more plates deliver more energy.

Figure 5:
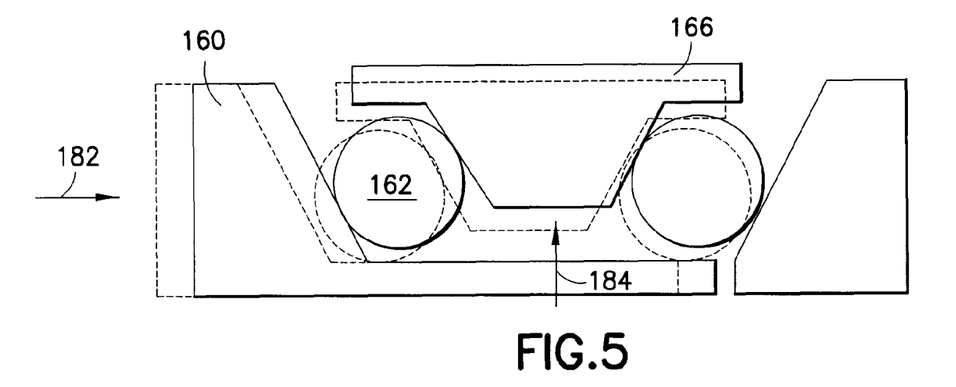
FIG. 5 illustrates a mechanism by which radial motion is converted to axial motion in a two cone converter used in the multimode downhole acoustic source.

Aligning the ceramic plates on a vertical axis rather than on a radial one means that the resulting displacement, when a voltage is applied to the stack of ceramic plates, will be axial too and thus parallel to the axis of the tool. However, as the fluid lies on its sides, a device is required to transform this axial displacement into a radial one. This is the role of the two rolling bar 162 cylinders and the cone sections 160, 166 (FIG. 3) driven by the ceramic stack 156. This device is called the cone converter and its function is illustrated in FIG. 5.

The piezoelectric ceramic plates (not shown) actuate 182 the cone converter by driving the slidable cone converter base 160 from position 1 (dashed) to position 2 (solid) and causing rotation of the rolling bar 162. Motion of the rolling bar 162 drives outward cone portion 166 radially outward 184. The outward cone portion 166 working in tandem with its sibling (166' in FIG. 3) from the other end of the stack of ceramic slates pushes the wall of the radiating plate 150 outwards, and thus the outside shell of the quadrant controlled by this section of the motor expands. The same goes for the other way around, when the ceramic plates shrink and the rolling bar 162 is driven inwards, the outward cone portions 166, 166' are driven towards the inside of the source.

Figure 6:
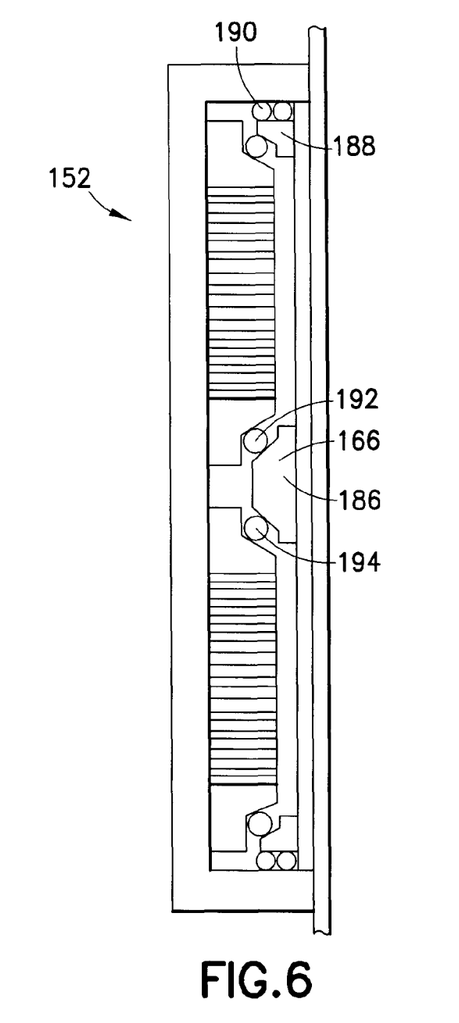
FIG. 6 illustrates radial motion being converted to axial motion in a motor having a combination of one cone converters and two cone converters.

FIG. 6 illustrates the tool design using two motors. It also shows that the devices converting the axial motion at each end of the tool use only one cone to convert the axial motion. At each end of the tool, several cylindrical rollers 190 support the reaction force of the motor allowing the conical part to move up and down with a low friction. The multi-mode acoustic source may use a two-cone converter 186 in combination with at least one one-cone converter 188 to transform the axial motion of the motor 152 into a radial displacement. The two-cone converter 186 uses two cylindrical rollers moving in rotation on the cone. The left 192 and right 194 cylindrical rollers roll on the conical surface moving up and down the outward cone portion 166 and therefore transform axial motion into a radial displacement. These rollers are comparable to a cylindrical roller bearing and their friction is low compared to sliding mechanisms or ball bearings.

Figure 7:
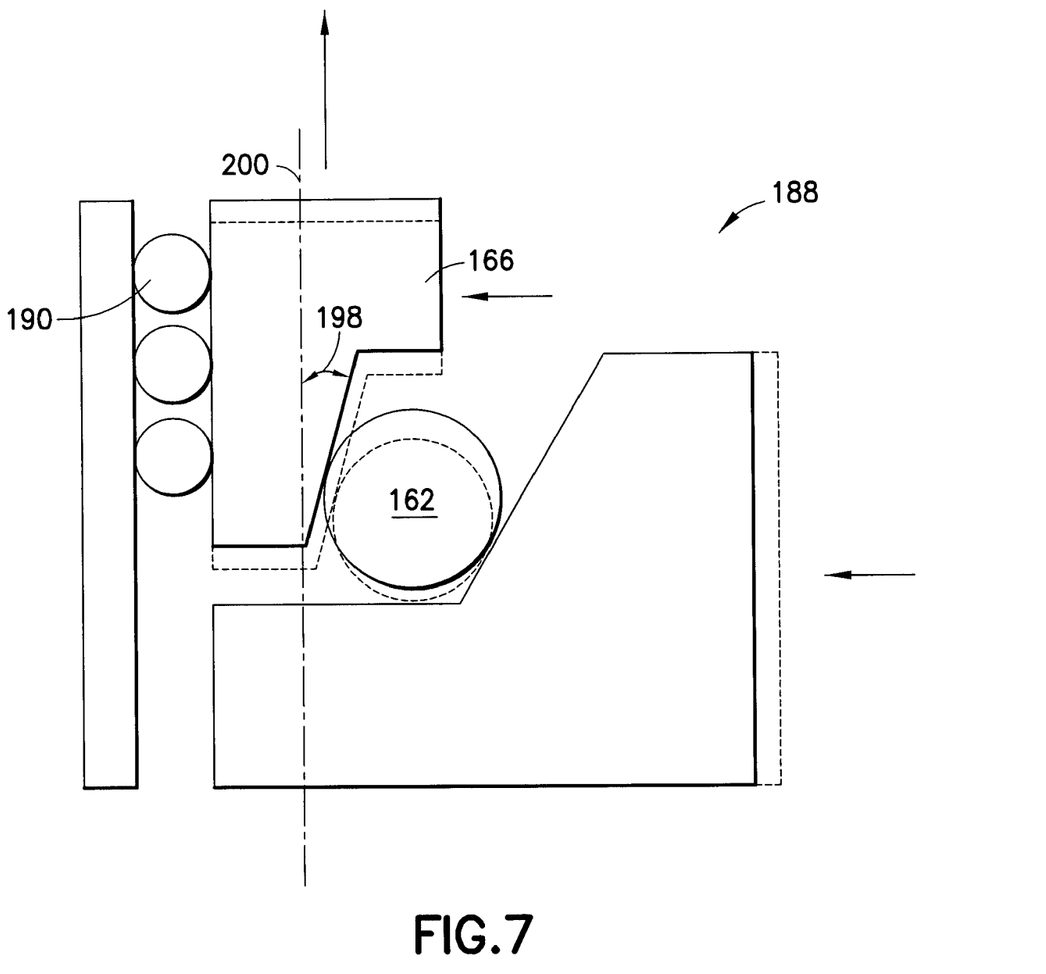
FIG. 7 illustrates a mechanism by which radial motion is converted to axial motion in a one cone converter used in the multimode downhole acoustic source.

The one-cone converter 188 illustrated in FIG. 7 is a simplified version of the two-cone convertor. It requires only one cylindrical roller 162 rolling on an outward cone portion 166 and several cylindrical rollers 190 distributed on a reaction surface. This simplified device has the advantage of being more compact. Like the two cones converter, the axial actuation force 182 causes the cylindrical roller 162 to rotate up and down the outward cone portion 166. The conical shape has its back surface in contact with several cylindrical rollers 190 to compensate the axial force and enable radial outward movement 184 of the conical part with low friction.

The designs described herein enable stacking more ceramic plates because the stacking is along the vertical (axial) direction as opposed to the standard approach where stacking is along the radial axis limiting therefore the number of ceramic plate one can insert (i.e. limited by the inner and outer diameters of the considered tool). Getting rid of this constraint means we can build a larger stack in the axial direction, using the axis of the cylindrical sonic tool for a core. However, a compromise must be reached between the number of ceramic plates and the frequency bandwidth used, for the higher the stack of ceramic plates, the more harmonics in the spectrum, and so the less wide the frequency bandwidth the source can be operated at.

The stack of ceramic and the cone convertor are preferably pre-stressed to operate in the compression state. The ceramic and the cone convertor can be pre-stressed together or each one separately. One load mechanism can be an outer sleeve, put on the radiating plate, this sleeve having the appropriate stiffness to load the actuator. Another option is to pre-stress the stack of ceramic with an inner screw and to compress the cone converter either with several pre-stressed screws holding the cone.

The summit angle 198 of the outward cone portion relative to a transverse axis 200 of the acoustic source can be estimated to fulfill the requirements of the source pulsing with different modes for a certain frequency range. A factor driving the value given to this angle is the necessity of impedance matching so as to efficiently transfer energy to the borehole medium. This angle determines the ratio of the radial to the axial displacement which can be tuned to match the impedance and optimize the energy transfer. This matching along with the increased number of ceramic plates results in more energy being radiated into the borehole fluid thereby boosting the signal at the receivers and improving the acoustic measurement.

The impedance modeling of the source involves equating motion of the actuator, force ($F_{plate}$) over displacement ($U_{plate}$) and the pressure radiated by the source in the medium of propagation pressure ($P.S_{fluid}$) over fluid particle velocity at the surface of the radiating plate ($U_{fluid}$). In order to maximize the energy radiation of the acoustic emitter, the impedance of the motor (Z) has to be equal to the impedance of the acoustic medium (Z) in the operating frequency range. The illustration of the impedance match can be seen for example as the need of high displacement when the source is operating in a fluid medium at low frequency while a much higher force to match the impedance of a stiff medium like the formation is needed. The impedance of the source is equal to:

$$\frac{F_{plate}}{U_{plate}} = \frac{P \cdot S_{fluid}}{U_{fluid}} = Z \quad (1)$$

The cone convertor transforms the displacement of the motor into a displacement on the radiating plate.

$$U_{plate} = \eta U_{motor} \quad (2)$$

By replacing this equation into the impedance equation, Z, the impedance match can be controlled by the factor η which is the amplification or the reduction of the displacement by the cone convertor Then the equation of the impedance becomes:

$$\frac{F_{plate}}{\eta U_{meter}} = \frac{P \cdot S_{fluid}}{U_{fluid}} = Z \quad (3)$$

The acoustic source is designed to create a pressure wave which will propagate in the formation through the surrounding fluid. The design of the source allows the acoustic radiation of several azimuthal modes, the modes 0, 1 and 2, corresponding respectively to monopole, dipole and quadruple modes. A detailed description of the radiation of each mode follows and presents the pattern they correspond to and the pressure wave they create in a free field and in the borehole. The free field calculation is based on a superposition method while the radiated pressure in the borehole is based on the assumption of a 2D model assuming the height of the source is infinite.

All acoustic sources investigated are cylinders of radius a, a shape that is governed by the tool geometry. These are modeled in a borehole with radius b. They are excited at an angular frequency ω, and the walls of the source are subjected to a force that commands a displacement, u. The pressure is then calculated at a point located on a circle of radius R from the core of the source, making an angle θ with the x axis (using a cylindrical coordinates system).

The described patterns are achieved through the use of one pulsating source for the monopole, two pulsating sources out of phase for the dipole, and of four different sources, each pair of a monopole pulsating out of phase for the quadrupole. The distance between each source center is defined as a/2 for dipole and quadrupole model.

Acoustic source radiating in a free field.

Considering the source pulsing in a free field, the source is alone and surrounded by an infinite space filled with fluid, which is an ideal representation. The calculation made for a source pulsing in a free field is based on the Helmholtz equation for wave propagation solved through Bessel functions of first kind, and upon a superposition method that depends on real source design. The model considered in this case consists of a 2 L-high cylinder. For each considered mode, i.e. monopole, dipole, quadrupole, finite elements modeling results and theoretical formulae will be presented. In each case, those results match with the theoretical ones predicted while solving the Helmholtz equation.

Monopole

The simplest mode, the zeroth mode, produces a pattern which can be achieved by either one source pulsing or the four azimuthal segments pulsing in phase. As it pulses, the source displaces a certain volume of fluid $V_0$, and the resulting pressure is given by:

$$P_0(R, \theta) = \frac{\rho \omega^2 V_0}{4\pi R} \quad (4)$$

The displaced volume being $V_0=4\pi aLu$, gives:

$$P_0(R, \theta) = \frac{\rho \omega^2 aLu}{R} \quad (5)$$

Dipole

The first order mode produces a pattern which can be achieved with two opposite sources beating in opposition and the two other ones at rest. As it pulses, the source displaces a certain volume of fluid $V_0$, and the resulting pressure is given by:

$$P_1(R, \theta) = -\frac{\rho \omega^2 V_0}{2\pi R} ke\cos\theta \quad (6)$$

The displaced volume being $V_0=2aLu$, gives:

$$P_1(R, \theta) = -\frac{\rho \omega^2 aLu}{\pi R} ke\cos\theta \quad (7)$$

Quadrupole

The quadrupole mode produces a pattern that can be achieved by having two opposite sources beating at the same time, and the two other ones beating in opposition. As it pulses, the source displaces a certain volume of fluid $V_0$, and the resulting pressure is given by:

$$P_2(R, \theta) = -\frac{\rho \omega^2 V_0}{4\pi R}(ke)^2 \cos(2\theta) \quad (8)$$

The displaced volume being $V_0=2aLu$, gives:

$$P_2(R, \theta) = -\frac{\rho \omega^2 aLu}{4\pi R}(ke)^2 \cos(2\theta) \quad (9)$$

Acoustic Source Radiating in a Borehole

Considering the source pulsing in an enclosed space in this case, the borehole, adds a new boundary condition: the pressure wave is completely reflected by the formation. This is what happens in the worst case configuration. In a real borehole, the pressure wave is partially absorbed by the formation before propagating back to the tool.

In this worse case configuration, the calculation made for a source pulsing in a borehole is based upon the Helmholtz equation solved through Bessel functions of first and second kind. The model considered this time is a planar one. The source is infinitely high and the 2D representation is a slice taken at a particular height position. For each considered mode, i.e. monopole, dipole, quadrupole, finite elements modeling results and theoretical formulae are presented. In each case, those results match with the theoretical ones predicted while solving Helmholtz equation. Building a comparison between the pressure predicted by the resolution of Helmholtz equation and the one resulting from finite elements computation—whether a formation is or is not spreading beyond the edge of the borehole—demonstrate the validity of the analytical development made to solve this problem.

Monopole

The pressure resulting from the pulsing of a monopole in a borehole is given by:

$$P_0(R, \theta) = \frac{\rho \omega^2 u}{k} \frac{Y_1(kb)J_0(kR) - J_1(kb)Y_0(kR)}{Y_1(kb)J_1(ka) - J_1(kb)Y_1(ka)} \quad (10)$$

Figure 8:
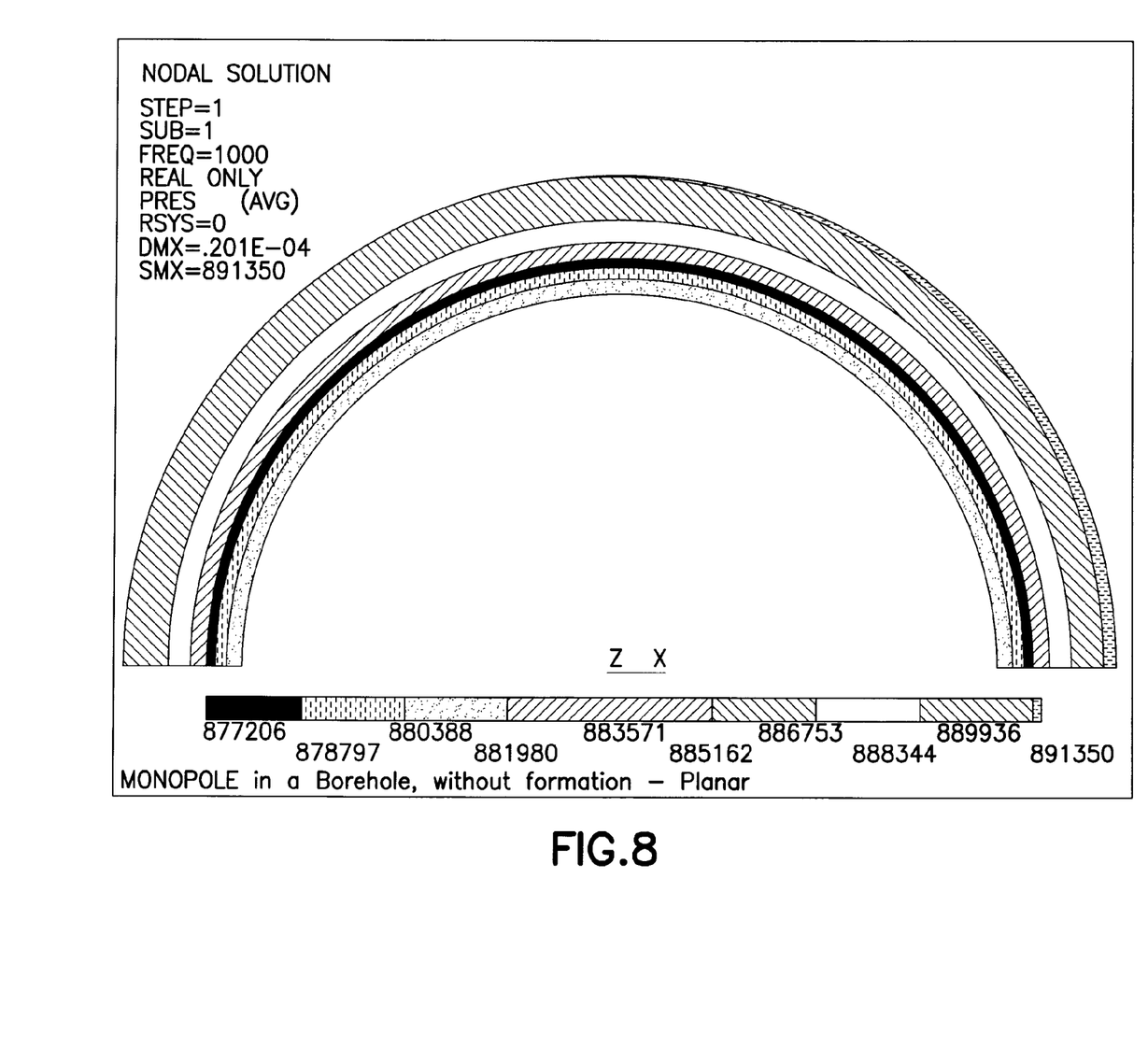
FIG. 8 is a finite elements model showing the acoustic radiation of the monopole source at 1000 Hz.

FIG. 8 is a finite elements model showing the acoustic radiation of the monopole source at 1000 Hz.

Dipole

The pressure resulting from the pulsing of a dipole in a borehole is given by:

$$P_1(R, \theta) = \quad (11)$$
$$-\rho\omega^2 ua \frac{(kbY_0(kb) - Y_1(kb))J_1(kR) - (kbJ_0(kb) - J_1(kb))Y_1(kR)}{(kaJ_0(ka) - J_2(ka))(kbY_0(kb) - Y_1(kb)) -} \cos\theta$$
$$(kbJ_0(kb) - J_1(kb))(kaY_0(ka) - Y_1(ka))$$

Figure 9:
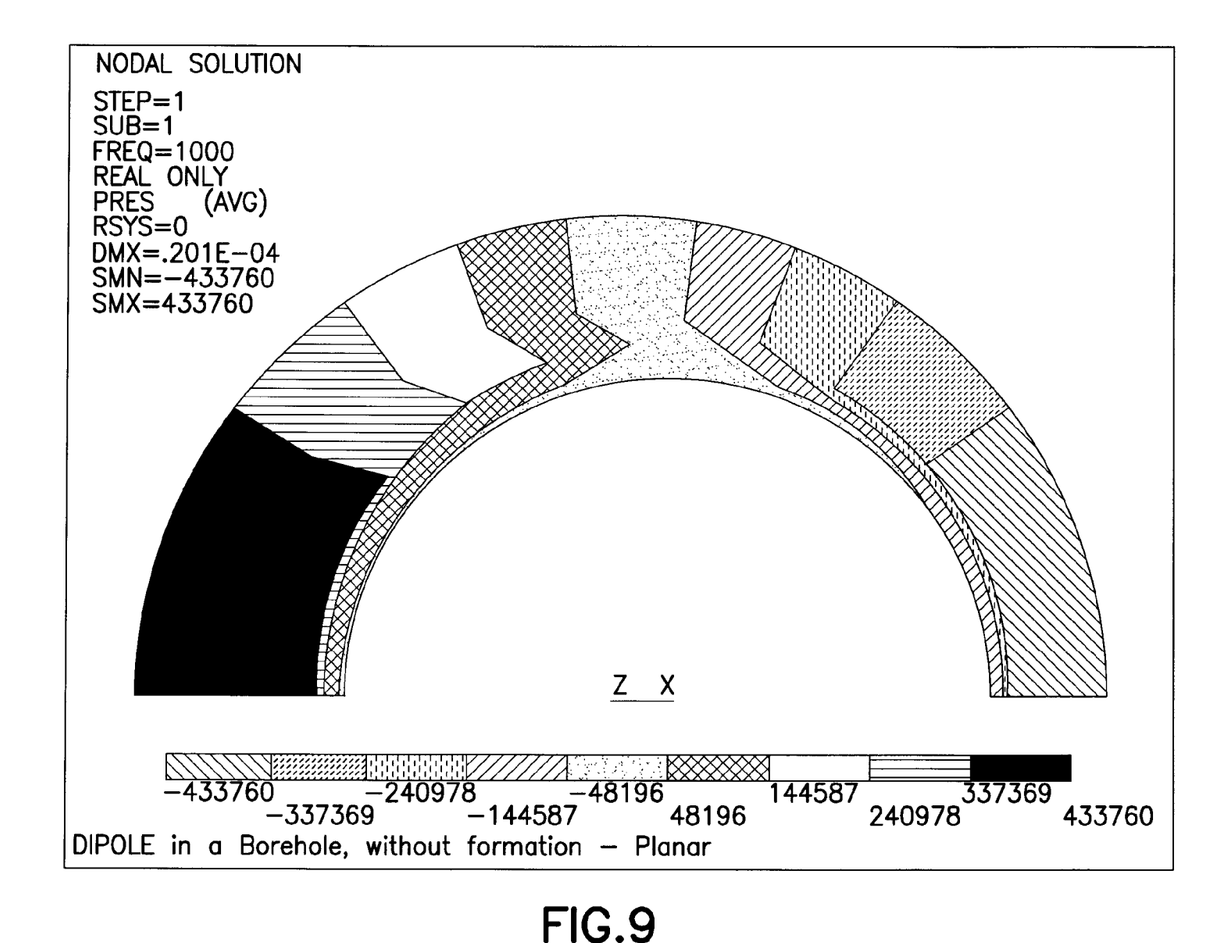
FIG. 9 is a finite elements model showing the acoustic radiation of the dipole source at 1000 Hz.

FIG. 9 is a finite elements model showing the acoustic radiation of the dipole source at 1000 Hz.

Quadrupole

The pressure resulting from pulsing of a quadrupole in a borehole is given by:

$$P_2(R, \theta) = -\rho\omega^2 ua \quad (12)$$
$$\frac{(kbY_1(kb) - 2Y_2(kb))J_2(kR) - (kbJ_1(kb) - 2J_2(kb))Y_2(kR)}{(kaJ_1(ka) - 2J_2(ka))(kbY_1(kb) - 2Y_2(kb)) -} \cos(2\theta)$$
$$(kbJ_1(kb) - 2J_2(kb))(k_2Y_1(ka) - 2Y_2(ka))$$

Figure 10:
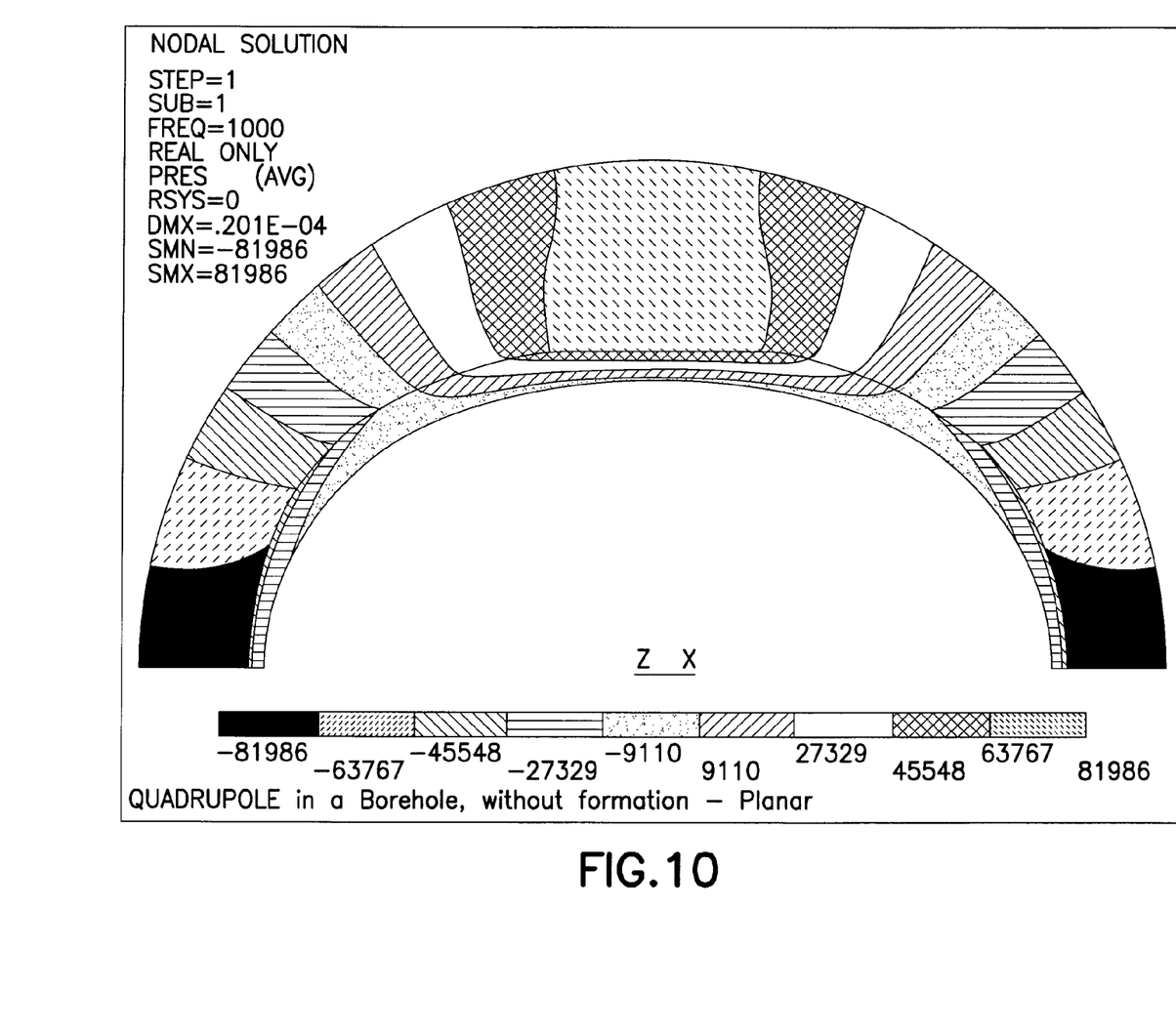
FIG. 10 is a finite elements model showing the acoustic radiation of the quadrupole source at 1000 Hz.

FIG. 10 is a finite elements model showing the acoustic radiation of the quadrupole source at 1000 Hz.

Figure 11:
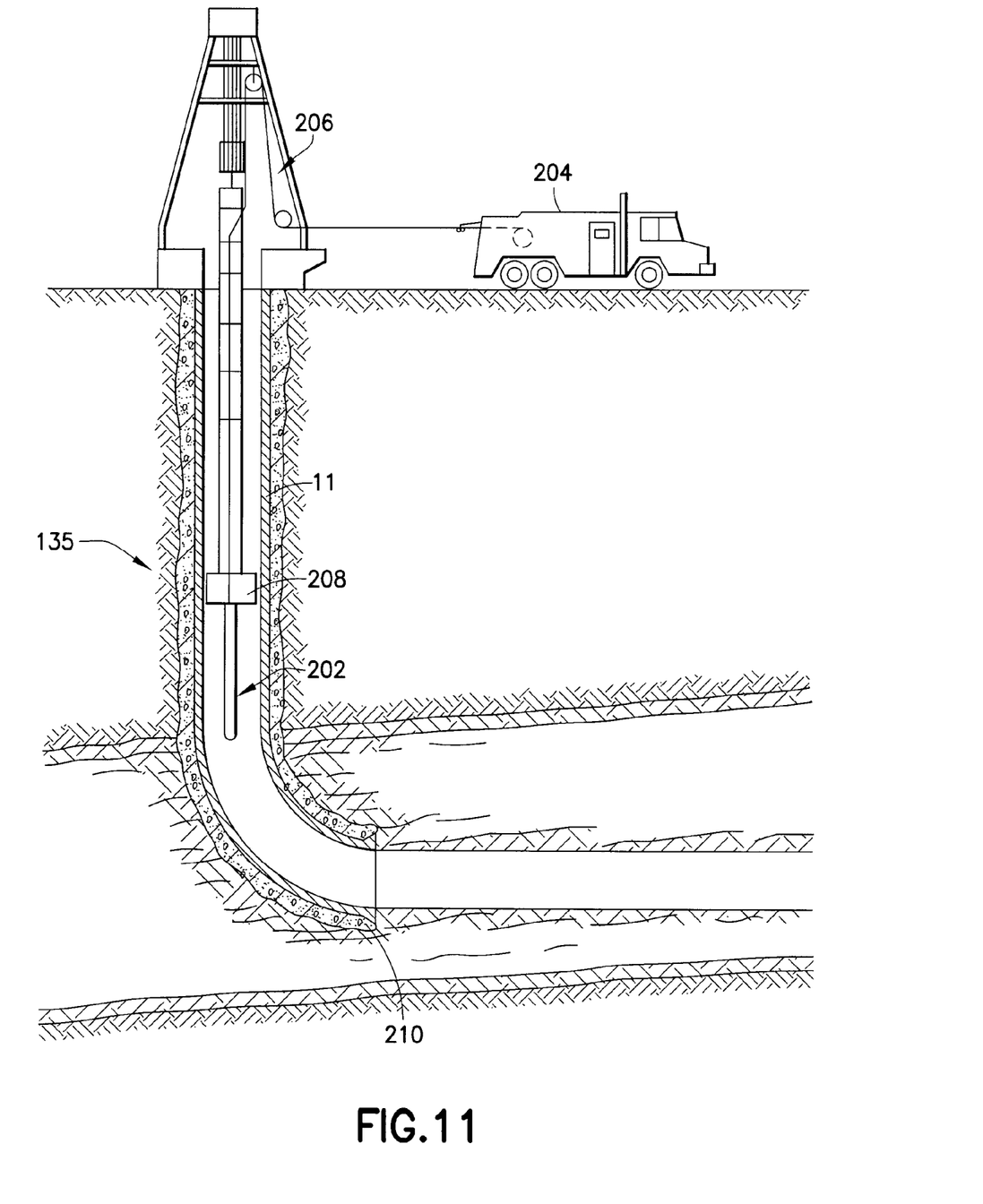
FIG. 11 illustrates a wireline logging system in which the downhole acoustic sources disclosed herein may be employed.

While described above for use with a logging-while-drilling system, the acoustic device also has utility with a wireline logging system. Referring to FIG. 11, to log a borehole 11 in formation 135, a measurement tool 202 is lowered into the borehole. The measurement tool 202 may be in direct electrical communication with a mobile control center 204 through an electrically conductive cable 206. An acoustic source device 208 functioning as described above is aligned along an axial axis of the bore hole 11 in proximity to the measurement tool 202. As indicated at arc 210, the acoustic source in both logging-while-drilling systems and wireline systems is effective in both vertical and non-vertical boreholes.

One or more embodiments of the present invention have been described. Nevertheless, it will be understood that various modifications may be made without departing from the spirit and scope of the invention. Accordingly, other embodiments are within the scope of the following claims.

What is claimed is:

1. An acoustic source device having a centrally disposed axial axis, comprising:

a plurality of radiating plates circumferentially disposed about said axial axis; and a drive mechanism effective to independently and reversibly move each said radiating plate from a first position to a second position in a direction transverse to said axial axis, wherein said drive mechanism includes a plurality of piezoelectric ceramic plates that change dimensions when an effective electric field is impressed, wherein said plurality of ceramic plates are stacked in said axial axis direction and said drive mechanism includes a mechanical linkage to convert axial movement of said plurality of piezoelectric ceramic plates to radial movement of said radiating plates, wherein said mechanical linkage is a cone converter having a slidable converter base having a first sloped surface and an outward moving cone portion having a second sloped surface, and wherein said first sloped surface and said second sloped surface are separated by a gap and facing each other, and wherein a cylindrical roller is disposed within said gap and contacts both said first sloped surface and said second sloped surface.

2. The acoustic source device of claim 1 wherein an angle of said second sloped surface relative to a transverse axis of said acoustic source device is selected to enhance transfer of acoustic energy to a formation external to said acoustic source device.

3. The acoustic source device of claim 2 wherein said angle of said second sloped surface is selected so that an impedance of said acoustic source device approximately matches an impedance of said formation.

4. The acoustic source device of claim 1 wherein a separate drive mechanism moves each said radiating plate.

5. An acoustic source device having a centrally disposed axial axis, comprising:

a plurality of radiating plates circumferentially disposed about said axial axis; and a drive mechanism effective to independently and reversibly move each said radiating plate from a first position to a second position in a direction transverse to said axial axis, wherein a separate drive mechanism moves each said radiating plate, wherein each said drive mechanism includes a plurality of piezoelectric ceramic plates stacked in said axial direction that change dimensions when an effective electric field is impressed and a mechanical linkage to convert axial movement of said plurality of piezoelectric ceramic plates to radial movement of said radiating plates, wherein said mechanical linkage is a cone converter having a slidable converter base having a first sloped surface and an outward moving cone portion having a second sloped surface, and wherein said first sloped surface and said second sloped surface are separated by a gap and facing each other, and wherein a cylindrical roller is disposed within said gap and contacts both said first sloped surface and said second sloped surface.

6. An acoustic source device for disposition in a borehole formed in a subterranean formation and with aligned along an axial axis of said borehole, comprising:

a plurality of radiating plates circumferentially disposed about said axial axis; and a drive mechanism effective to independently and reversibly move each said radiating plate from a first position to a second position in a direction transverse to said axial axis, wherein a separate drive mechanism moves each said radiating plate, wherein each said drive mechanism includes a plurality of piezoelectric ceramic plates stacked in said axial direction that change dimensions when an effective electric field is impressed and a mechanical linkage to convert axial movement of said plurality of piezoelectric ceramic plates to radial movement of said radiating plates, wherein said mechanical linkage is a cone converter having a slidable converter base having a first sloped surface and an outward moving cone portion having a second sloped surface, wherein said first sloped surface and said second sloped surface are separated by a gap and facing each other, and wherein a cylindrical roller is disposed within said gap and contacts both said first sloped surface and said second sloped surface.

7. The acoustic source device of claim 6 wherein said angle of said second sloped surface is selected so that an impedance of said acoustic source device approximately matches an impedance of said formation.

8. The acoustic source of claim 6 wherein said acoustic source is proximate a drill bit.

9. The acoustic source of claim 6 wherein said acoustic source is proximate a measurement device.

10. A method to generate acoustic waves useful for logging a subterranean formation, comprising the steps of:

lowering an acoustic source device into a borehole formed in a subterranean formation wherein said acoustic source device is aligned along an axial axis of said borehole and has a plurality of radiating plates circumferentially disposed about said axial axis; and using a separate drive mechanism to independently and reversibly moving each said radiating plate from a first position to a second position in a direction transverse to said axial axis, wherein said drive mechanism includes a plurality of piezoelectric ceramic plates stacked in said axial direction that change dimensions when an effective electric field is impressed and a mechanical linkage to convert axial movement of said plurality of piezoelectric ceramic plates to radial movement of said radiating plates, wherein said mechanical linkage is a cone converter having a slidable converter base having a first sloped surface and an outward moving cone portion having a second sloped surface, wherein said first sloped surface and said second sloped surface are separated by a gap and facing each other, and wherein a cylindrical roller is disposed within said gap and contacts both said first sloped surface and said second sloped surface.

11. The method of claim 10 wherein at least one of said plurality of radiating plates pulses at a frequency whereby an impedance of said acoustic source device approximately matches an impedance of said subterranean formation.

12. The method of claim 11 wherein all of said radiating plates pulse at said same frequency in phase.

13. The method of claim 11 wherein two opposing radiating plates pulse at the same frequency, but are out of phase.

14. The method of claim 13 wherein said two opposing radiating plates are approximately 180° out of phase.

15. The method of claim 11 wherein a first set of opposing radiating plates are perpendicular to a second set of opposing radiating plates in a direction perpendicular to said axial axis and all such radiating plates pulse at the same frequency, wherein said first set are in a first phase and said second set are in a second phase and said first phase and second phase are out of phase relative to each other.

16. The method of claim 15 wherein said first phase and said second phase are offset by approximately 180°.

17. The method of claim 10 including the step of connecting said acoustic device to a drill string in proximity to a drill bit.

18. The method of claim 10 including the step of connecting said acoustic device to a wireline in proximity to a measurement device.

* * * * *